US008015283B2

United States Patent
Seidel

(10) Patent No.: US 8,015,283 B2
(45) Date of Patent: Sep. 6, 2011

(54) COOPERATIVE MONITORING OF PEER-TO-PEER NETWORK ACTIVITY

(75) Inventor: Craig H. Seidel, Palo Alto, CA (US)

(73) Assignee: Motion Picture Laboratories, Inc., Palo Alto, CA (US)

( * ) Notice: Subject to any disclaimer, the term of this patent is extended or adjusted under 35 U.S.C. 154(b) by 137 days.

(21) Appl. No.: 12/432,562

(22) Filed: Apr. 29, 2009

(65) Prior Publication Data

US 2009/0276522 A1 Nov. 5, 2009

Related U.S. Application Data

(60) Provisional application No. 61/049,065, filed on Apr. 30, 2008, provisional application No. 61/052,619, filed on May 12, 2008.

(51) Int. Cl.
*G06F 15/173* (2006.01)
(52) U.S. Cl. ........................ 709/224; 709/234
(58) Field of Classification Search .................. 709/224, 709/223, 225, 226, 230–237; 340/3.1–3.9; 370/252–259; 714/39, 47
See application file for complete search history.

(56) References Cited

U.S. PATENT DOCUMENTS

| 6,732,180 | B1 | 5/2004 | Hale et al. ................ 709/229 |
| 7,031,264 | B2 | 4/2006 | Adhikari et al. ............ 370/252 |
| 2002/0069098 | A1 | 6/2002 | Schmidt ...................... 705/7 |
| 2002/0087885 | A1 | 7/2002 | Peled et al. ................ 713/201 |
| 2003/0196148 | A1 | 10/2003 | Harrisville-Wolff et al. ... 714/47 |
| 2005/0108248 | A1 | 5/2005 | Natunen ..................... 707/10 |
| 2005/0114709 | A1* | 5/2005 | Moore ....................... 713/201 |
| 2005/0144288 | A1 | 6/2005 | Liao ........................ 709/227 |
| 2005/0198020 | A1 | 9/2005 | Garland et al. ............... 707/3 |
| 2006/0218222 | A1 | 9/2006 | Brahmbhatt et al. ......... 709/201 |
| 2007/0078769 | A1 | 4/2007 | Way ........................ 705/51 |
| 2007/0078990 | A1 | 4/2007 | Hopkins .................... 709/227 |
| 2007/0088845 | A1* | 4/2007 | Memon et al. .............. 709/234 |
| 2008/0005336 | A1 | 1/2008 | Cohen et al. ............... 709/227 |
| 2008/0031148 | A1 | 2/2008 | Sagy ....................... 370/252 |

FOREIGN PATENT DOCUMENTS

| GB | 2371898 A | 8/2002 |
| GB | 2372416 A | 8/2002 |
| KR | 10-2004-0107394 | 12/2004 |
| WO | WO 2006/131909 | 12/2006 |

OTHER PUBLICATIONS

PCT Search Report for PCT Application No. PCT/US2009/042140.

* cited by examiner

*Primary Examiner* — Wing F Chan
*Assistant Examiner* — Ruolei Zong
(74) *Attorney, Agent, or Firm* — Dov Rosenfeld; Inventek

(57) ABSTRACT

Particular embodiments include cooperative monitoring of peer-to-peer activity on a network including maintaining communication between a local monitoring process and a network monitoring process such that a process can use both network monitoring and local monitoring. The cooperative monitoring includes monitoring a local peer using local monitoring of a point in the network by monitoring packets passing through the point, monitoring the network using network monitoring by a monitoring system or agent coupled to the network, and analyzing the result of network monitoring and local monitoring to determine at least one file transfer association with the local peer.

30 Claims, 6 Drawing Sheets

COOPERATIVE MONITORING OF PEER-TO-PEER NETWORK ACTIVITY

RELATED APPLICATIONS

The present invention claims benefit of and is a conversion of U.S. Provisional Applications Nos. 61/049,065 filed Apr. 30, 2008 and 61/052,619 filed 12 May 2008 each to inventor Seidel, and each titled COOPERATIVE MONITORING OF PEER-TO-PEER NETWORK ACTIVITY. The contents of each of U.S. 61/049,065 and U.S. 61/052,619 are incorporated herein by reference.

FIELD OF THE INVENTION

The present disclosure relates generally to peer-to-peer networks.

BACKGROUND

Peer-to-peer (P2P) networks are known and used for various purposes such as exchange of data between nodes in the network, —peers in the network—without the need for an intermediary, e.g., a central server providing the data. One popular use of P2P networks is the illegal exchange of copyrighted material.

P2P monitoring is used to monitor P2P exchanges and to determine, e.g., if an exchange is legitimate or not, and if illegitimate, e.g., involving illegal exchange of copyrighted material, to identify one or more of the participants.

Monitoring techniques typically are classified into two types which we call network monitoring and local monitoring herein.

Network monitoring includes using one or more processes, called network monitor, e.g., Internet monitor agents, or simply Internet monitors herein, each running on a device, e.g., a computer system connected to the network. The term "Internet" in Internet monitoring suggests this is applicable only to the Internet, but in fact, network monitoring is applicable to any network in which the activity is being monitored. Typically, the network is the Internet. The device, e.g., the computer running the network monitoring process, e.g., agent is also called a network monitor herein. A network monitor is configured to use one or more P2P protocols, e.g., to join a P2P network to monitor P2P activity in the network being monitored, to collect information on the activity, including information on data exchanged in the activity or activities being monitored, and possibly to act in response to determined information. Network monitoring has advantages, but also has disadvantages.

Local monitoring involves monitoring traffic in a part of the network and analyzing that traffic. One example of local monitoring is a packet sniffer analyzes packets flowing through some point in the network, e.g., that examines packet exchanges at the point in the network and analyzes the packets and/or packet flow to determine what protocols are being used and possibly the data involved in such use. Local monitoring has advantages, but also has disadvantages.

Method embodiments of the present invention include methods that combine one or more features of local monitoring with one or more features of Internet monitoring. Other embodiments include software that when executed implements such a method, and an apparatus that implements such a method.

DESCRIPTION OF EXAMPLE EMBODIMENTS

Overview

Figure 1:
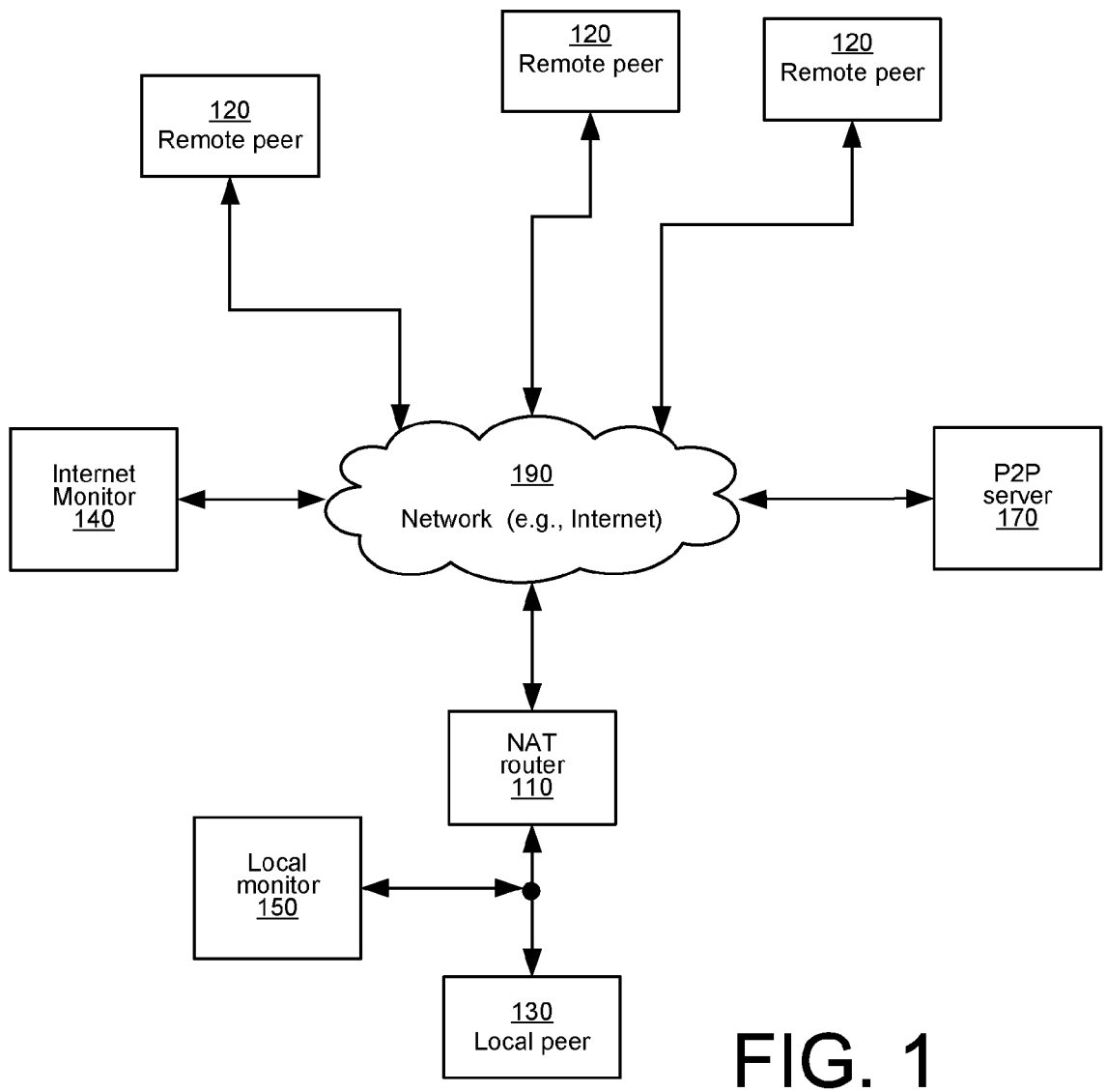
FIG. 1 shows a simplified block diagram of an example network that has a P2P server, and in which P2P activity may occur.

Predominant peer-to-peer (P2P) monitoring techniques occur either by monitoring traffic within a network or by joining a P2P exchange. The present invention provides a method of cooperatively combining these techniques to increase monitoring coverage. The combined technique may include mechanisms for acting on detections of P2P traffic.

Although this technique can be used to generally improve the quality of data collected, it is particularly focused on gathering data in the presence of encryption, obfuscation and other methods that make data collection more difficult.

One embodiment includes collecting data on the network where the peer resides, e.g., local monitoring, and collecting information on the Internet, e.g., by network monitoring.

One embodiment includes combining data from the two types of monitoring to develop conclusions. The method thus collects data and then makes sense of it.

One embodiment includes the two types of monitoring working cooperatively. The method includes establishing a communication link between a system or process carrying out local monitoring and a system or process carrying out network monitoring to collect the data and draw conclusions.

Different specific technique of inferring behavior include using a combination of some knowledge of some peers' file activities and traffic flow analysis to determine a specific peer's activities.

The methods described herein are important because some of the biggest problems in P2P monitoring are encryption and obfuscation, in particular hiding who you are talking to.

Particular embodiments include a method of operating a processing system for cooperative monitoring of peer-to-peer activity on a network. The method includes maintaining communication between a local monitoring process and a network monitoring process such that a process can use both network monitoring and local monitoring. The method further includes monitoring a local peer using local monitoring of a point in the network by monitoring packets passing through the point, monitoring the network using network monitoring by a monitoring system or agent coupled to the network, and analyzing the result of network monitoring and local monitoring to determine at least one file transfer association with the local peer. An example embodiment further includes taking action on the file transfer association with the local peer. The analyzing includes combining a result of network monitoring with a result of local monitoring, and/or wherein the local monitoring may use a result of network monitoring, and/or wherein the network monitoring uses a result of local monitoring.

Particular embodiments include one or more computer-readable storage media configured with instructions that when executed by one or more processors of at least one processing system coupled to a network cause cooperative monitoring of peer-to-peer activity on the network. The cooperative monitoring maintaining communication between a local monitoring process and a network monitoring process such that a process can use both network monitoring and local monitoring. The cooperative monitoring further includes monitoring a local peer using local monitoring of a point in the network by monitoring packets passing through the point, monitoring the network using network monitoring by a monitoring system or agent coupled to the network, and analyzing the result of network monitoring and local monitoring to determine at least one file transfer association with the local peer. An example embodiment further includes taking action on the file transfer association with the local peer. The analyzing includes combining a result of network monitoring with a result of local monitoring, and/or wherein the local monitoring may use a result of network monitoring, and/or wherein the network monitoring uses a result of local monitoring.

Particular embodiments include apparatus comprising one or more processing systems that each include at least one processor and a storage subsystem, the one or more processing systems coupled to a network, and configured to carry out cooperative monitoring of peer-to-peer activity on the network by being configured to maintain communication between a local monitoring process operating on one of the processing systems that is coupled to a point of the network and a network monitoring process operating on one the processing systems such that cooperative monitoring can use both network monitoring and local monitoring. The apparatus is further configured to carry out cooperative monitoring by being configured to monitor a local peer using local monitoring of the point in the network by monitoring packets passing through the point on the processing systems coupled to the point of the network, monitor the network using network monitoring, and analyze the result of network monitoring and local monitoring to determine at least one file transfer association with the local peer. The analyzing in some versions includes combining a result of network monitoring with a result of local monitoring, and/or wherein the local monitoring may use a result of network monitoring, and/or wherein the network monitoring uses a result of local monitoring.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

Some Example Embodiments

Many types of P2P networks and protocols are known. The BitTorrent protocol is used herein as an example P2P protocol, but the invention is in no way limited to such a protocol. Other P2P protocols also are known, and the invention also is applicable to such other P2P protocols. Terminology common to the BitTorrent protocol is also used herein. Another protocol used in some examples herein is the eDonkey file sharing protocol that uses ed2k links, using programs such as eDonkey2000 (hence "eD2k"), eMule, Hybrid, MLDonkey, and others using the eDonkey file sharing protocol. An eDonkey network is sometimes called an eD2k network.

Local Monitoring and Network Monitoring

FIG. 1 shows a network 190, which can be the Internet, but is not necessarily the Internet, e.g., can be a local network, or some other network. The network 190 includes a P2P network using at least one P2P server 170, and one or more peers 120, 130, using a P2P protocol to communicate. The P2P server includes one or more processors, and a storage subsystem that has stored therein executable instructions that when executed carry out P2P server functionality.

A peer is a node in the network, and is typically a computer system that includes one or more processors, a network interface, and a storage subsystem, e.g., at least memory. The terms computer and computer system are used broadly herein and includes any processing apparatus or system that when acting as a node in the network includes a network interface and is coupled to the network, and that can participate in a network data exchange. The network interface can be wired or wireless.

FIG. 1 shows an apparatus, e.g., a computer system 150 that is configured to carry out a local monitoring process, and that includes one or more processors, a network interface, and a storage subsystem, e.g., at least memory, and a network interface connected to a particular point in the network close to a particular one of the peers, called the local peer 130 herein. The storage subsystem has therein instructions that when executed carry out the local monitoring process at the particular point close to the local peer 130. A computer system or other apparatus configured to carry out a local monitor process is called a local monitor herein. There may be several local monitors each monitoring a respective point in the network. In one embodiment, the local monitoring occurs in an area where network addresses, e.g., IP addresses can be mapped to actual users. For example, FIG. 1 shows a network address translation (NAT) router 110 between the local peer 130 and the network 190. Such a NAT router re-writes source and/or destination IP addresses and typically also the TCP/IDP port numbers of IP packets as they pass through. One or more firewalls also might be involved, and such firewalls can be assumed to be included in NAT device 110. The monitoring service by local monitor 150 is in this example in the same NAT domain as the computer involved in P2P protocol exchange, in this case, as the particular local peer 130.

The local monitor 150 is configured to capture packets from the particular point in the network and analyze the packets. Analysis may come in many forms including, but not limited to, inspecting the contents of the packets (sometimes called deep packet inspection or DPI), and examining the flow of packets to look for identifying patterns. Such analysis might also include stateful packet analysis that examines a stream of packets in order to determine one or more protocols that are being operated. Such local monitoring techniques are known to those in the art, and often applied, for example, to security services that protect and monitor networks, e.g., firewalls, intrusion detection systems (IDS), intrusion prevention systems (IPS), packet shapers, load balancers, and network packet monitors. See for example, the following US patents: U.S. Pat. Nos. 6,651,099, 6,665,725, 6,771,646, 6,789,116, 6,816,459, 6,839,751, 6,954,789, 7,255,558, and 7,299,282 that cover different aspects of packet monitoring to determine the protocol and conversational flows.

With local monitoring, the scope of the network being examined may be as small or large as the monitoring system can handle. Local monitoring occurs in an area where network addresses, e.g., IP addresses can be mapped to actual users. For example, the monitoring service is in the same NAT domain as the computer involved in a P2P protocol exchange.

The advantage of local monitoring is that it enables matching a P2P protocol exchange to an actual device.

The disadvantage of local monitoring is that it may not be possible to fully observe a P2P transaction. For example, data in a P2P transaction may be encrypted or obfuscated. Furthermore, there may be too much traffic to capture enough data for identification.

FIG. 1 also includes a computer system 140 configured to carry out a network monitoring process, e.g., an Internet monitoring process, and that includes one or more processors, a storage subsystem, e.g., at least a memory, and a network interface connected to the network 190. The storage subsystem includes instructions that when executed carry out the network monitoring process, e.g., the Internet monitoring process. A computer system or other apparatus that is configured to run a network monitoring process is called a network monitor herein. In the common case that the network being monitored is the Internet, the network monitor may be referred to as an Internet monitor. A network monitoring process of a network monitor 140 is operative in a P2P network and includes using one or more P2P protocols to monitor P2P network activity in the network, to collect data on such P2P network activity, and possibly to act on the collected data. Those in the art familiar with P2P network protocols would be familiar with many such network monitoring methods. Consider the BitTorrent P2P protocol as an example. One example network monitoring process includes a software agent (a "monitoring agent") running on a computer system, e.g., a server coupled to the network, connecting to one or more BitTorrent trackers that are each coupled to the network. Consider one such BitTorrent tracker. The agent uses a BitTorrent tracker protocol to download information associated with a torrent file—in BitTorrent terms, a metadata file typically ending in ".torrent"—including, but not limited to, information about peers who have indicated they are interested in participating in file sharing for this torrent file. The network monitoring process includes the agent collecting information including network addresses, e.g., IP addresses and ports used. In one version, the network monitoring process includes the agent then connecting to one or more computers indicated by the trackers as computers that are interested in file transfer. Once connected, the agent uses the BitTorrent peer-peer protocol to retrieve information. Such retrieved information may include, but is not limited to, information about the particular peer it is connected to, e.g., information on the amount of the file available for transfer, information about the status of connections, and information about other peers who have expressed interest in file exchange (the peer-exchange).

It is known that some networks use protocols related to distributed hash tables (DHT) to allow data to be maintained without a centralized server. A network monitoring method can be used to retrieve DHT information.

Some embodiments of network monitoring include participating in file transfers with a particular computer in order to further verify the particular computer's level of participation in file transfers.

One advantage of network monitoring is that it is very difficult for a peer to hide from a network monitoring agent. A particular computer joining a P2P network is essentially publicizing its intent to exchange files. A monitoring agent would generally have as much access to information on file sharing with that particular computer as any other computer that might participate in file sharing with that particular computer. Any computer that hides from peers reduces its ability to transfer files.

One shortcoming of network monitoring is that it may be difficult to relate collected information back to actual computers. Typically, information about a peer exchanging files includes an IP address and a port. The IP address and port may be the actual IP address and port of a peer, but more typically, the actual IP address is hidden behind a NAT router (see 110 in FIG. 1). Such a NAT router obfuscates the actual IP address.

Another shortcoming of network monitoring is that there may be barriers to connecting to a particular computer involved in P2P file exchange. One possible barrier is the presence of a NAT device or server. A NAT device or server is able to avoid exposing computers within its domain to computers outside its domain, e.g., to the network, e.g., the Internet in general. Thus it may not be possible to connect to a computer that is behind a NAT server. Another possible barrier is the presence of a firewall system or other intrusion prevention system (IPS) between the network monitoring agent and a particular computer involved in exchanging files. An IPS may block attempts to connect to that particular computer. More broadly, in IP networks, reasons that network monitoring alone might not be effective include that an IP address and port combination for a particular computer may not be "routable," meaning that there is no mechanism using the Internet protocol (IP), with which one or more computers can be reached.

Another shortcoming of network monitoring is vulnerability to anti-monitoring measures—methods used in P2P networks to reduce the effectiveness of network monitoring. Such anti-monitoring measures include but are not limited to: 1) identifying known monitoring agents and blocking their IP addresses, 2) recognizing protocol peculiarities of monitoring agents, and 3) using peer authentication to authenticate peers to distinguish real peers from monitoring agents. There are known countermeasures to such anti-monitoring measures. Countermeasures to anti-monitoring historically have led to escalation of the effectiveness of anti-monitoring measures, such that countermeasures typically have not been effective for long.

Swarm Participating Determination

A swarm in BitTorrent terminology means the set of computers that are collectively connected for a particular file. For example, if one runs a BitTorrent client program for a file, and that program indicates it is connected to ten peers and three seeds, then the swarm consists of the local peer running the BitTorrent client and those 13 other computers.

By swarm participation determination is meant a set of processes using network monitoring that includes the steps of identifying all participants in all peer file exchanges and determining for a particular peer being monitored, and for a set of files of interest, a set of involvements that imply a transfer of one or more particular files by the monitored peer. Swarm participation determination thus might include gathering information about a large number of file transfers and collecting a significant portion of the set of network addresses, e.g., IP addresses and ports associated with each exchange.

Global swarm participation determination with a list of peers enables narrowing the size of the set of files potentially being transferred by a particular peer being monitored. With enough data, the list may often be narrowed to one file.

Figure 4:
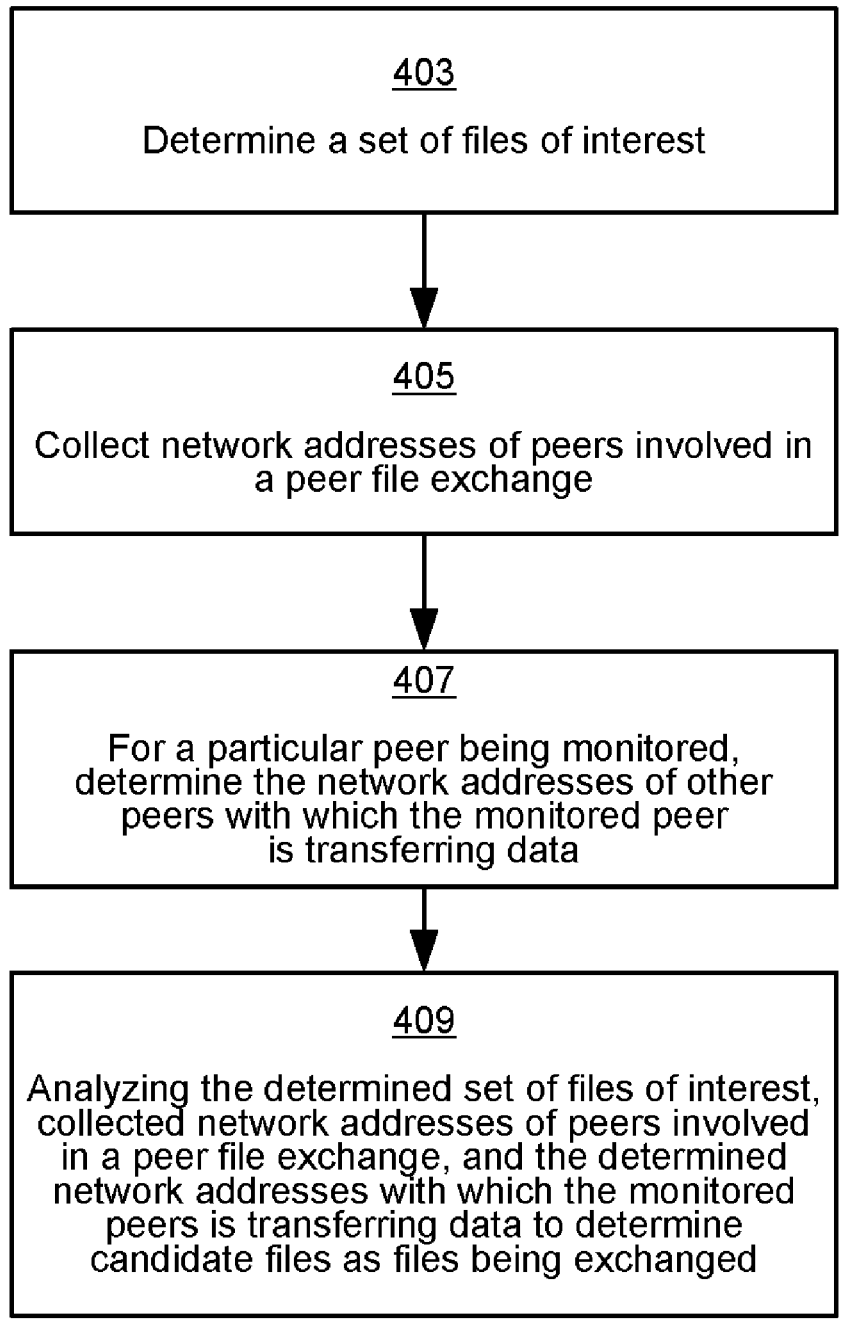
FIG. 4 shows a simplified flowchart of one embodiment of a swarm participation determination method.

FIG. 4 shows a simplified flowchart of one embodiment of method of swarm participation determination carried out using network monitoring and analysis related to a particular peer being monitored. While the flowchart shows the steps being carried out in a specific order, in general, these steps do not have to be followed in strict order, except where specified or clear from the context.

The method includes in 403 determining a set of files of interest, e.g., collecting a list of files of interest. Determining the list is typically done by searching, and techniques to determine the list of files are well known and in common use. Examples, for the case of BitTorrent include running queries of torrent files that match one or more lexographic or other search criteria. Example include techniques used in such popular torrent search tools as isohunt at www^dot^isohunt-^dot^com, ScrapeTorrent at scrapetorrent^dot^com, and Torrent Scan at torrentscan^dot^com, all Websites retrieved on Apr. 28, 2008, where "^dot^" indicates a period in the actual URL. See also the Mininova server on the Internet, at www-^dot^mininova^dot^org, retrieved on Apr. 28, 2008. See also the WWW::Search::Mininova component for a module that provides an interface to Mininova^dot^org server. See search ^dot^cpan^dot^org/~zoffix/WWW-Search-Mininova-0^dot^05/lib/WWW/Search/Mininova^dot^pm (retrieved Apr. 30, 2008). Again, "^dot^" indicates a period.

The method further includes in 405 collecting network addresses involved in a peer file exchange—in one embodiment, as many as can practically be determined. How to determine peers, e.g., all peers involved in a transfer would be known to those in the art, and such methods are in common use, e.g., in ed2k P2P networks and BitTorrent P2P networks. One such method, e.g., for the case of BitTorrent includes communicating with one or more BitTorrent trackers and running a query for IP addresses, and then using "peer exchange," a feature of the BitTorrent protocol to obtain more IP addresses. How to implement embodiments for other protocols would be clear to one in the art.

The method further includes in 407 for a particular peer being monitored, determining the network addresses of other peers with which the particular peer being monitored is transferring data. Example methods for step 407 are described in more detail below.

The method further includes in 409 combining these lists of files of interest, of network addresses of peers involved in a peer file exchange, and of addresses a peer being monitored is transferring data with to determine candidate files as files being exchanged.

Figure 3:
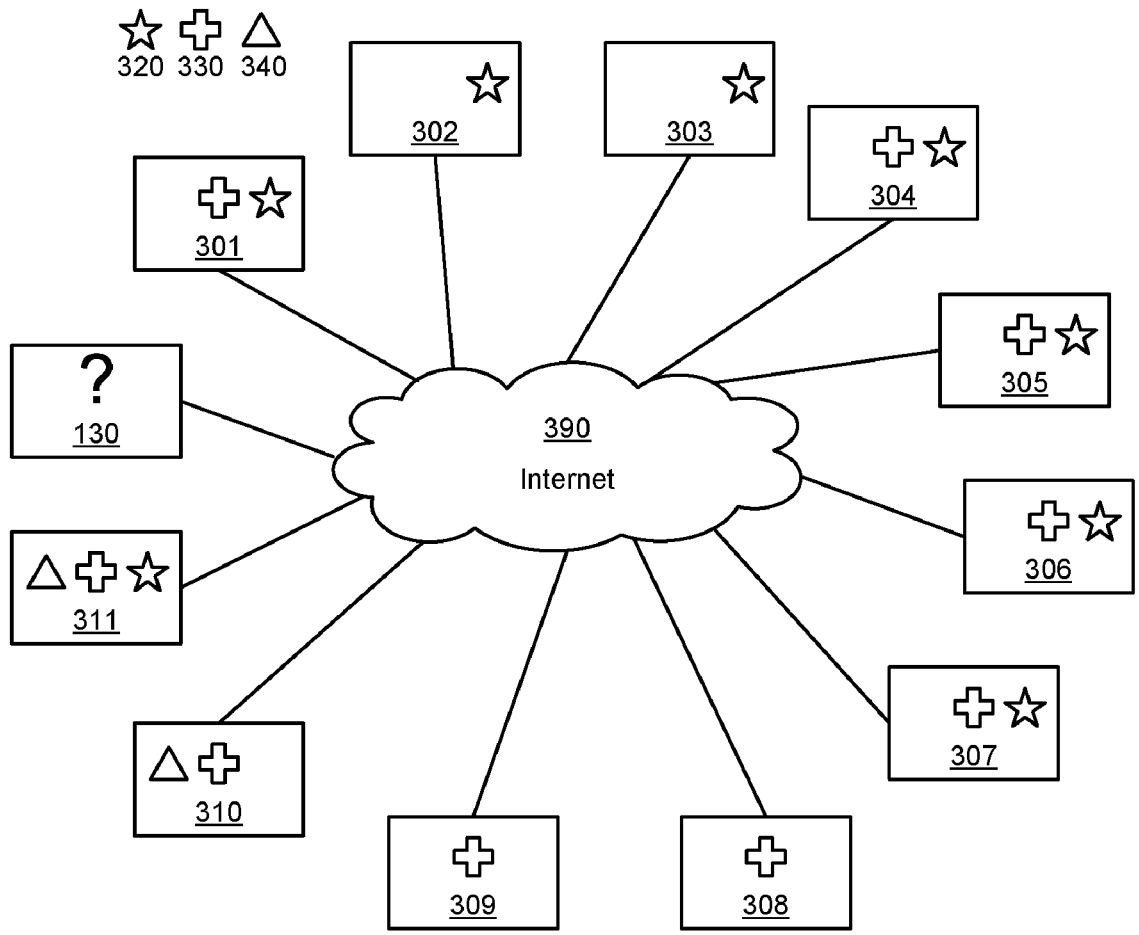
FIG. 3 shows a simple representation of example systems on a P2P network involved in transferring files and is used for illustrative purposes herein.

FIG. 3 shows a simple representation of example peers on a P2P network involved in transferring files. This example is of course of a scale much smaller than the scale of actual P2P exchanges, and is provided herein for purpose of understanding of features of the invention. The reference numerals are also used in as the network addresses. Suppose there are a particular local peer 130 and a plurality of remote peers 301-311. Each peer is represented by a box. Each of peers 301-311 and 130 is connected to the Internet. Each of peers 301-311 and 130 may be involved in one or more transfers. Suppose there are three unique files called Star 320, Plus 330 and Triangle 340. A particular peer's involvement in the exchange of any of files 320, 330, 340 is indicated by that peer being shown with the shape of the exchanged file inside the box for that peer. For example, peer 311 is involved in exchanges of all three files 320, 330, 340, while peer 308 is involved with only the exchange of file 330 (the Plus). Local peer 130 has a question mark representing that we do not know which files it is exchanging. There may be other peers involved in the P2P activity, but for the purpose of explanation, only the peers shown in FIG. 3 are described. A network monitor 140 and a local monitor 150 are assumed to exist as shown as in the network of FIG. 1 (except that the network is now indicated by 390).

To illustrate an embodiment of swarm participation determination, step 405 includes collecting all network addresses of peers involved in a peer file exchange of any of the three files 320 Star, 330 Plus and 340 Triangle. Suppose for the sake of illustration, this yields a list shown in Table 1 below. Those in the art will understand that the information is shown in a simplified structure, and computer science data structure techniques can be applied to better structure the information according to the data processing tasks being carried out.

TABLE 1

| Address | Star | Plus | Triangle |
|---------|------|------|----------|
| 301 | y | y | |
| 302 | y | | |
| 303 | y | | |
| 304 | y | y | |
| 305 | y | y | |
| 306 | y | y | |
| 307 | y | y | |
| 308 | | y | |
| 309 | | y | |
| 310 | | y | y |
| 311 | y | y | y |

Step 407 includes, for the monitored peer 130, determining the network addresses of other peers with which peer 130 is transferring data. Knowing with which other peers peer 130 is communicating, allows the method determining the set of files peer 130 may be transferring (step 409). In some cases, the method in step 409 can determine exactly which of the files peer 130 is transferring. To continue with the illustrative example, Table 2 below describes the results of step 407 and includes for each other peer, the analysis of step 409 of which files may be involved.

TABLE 2

| Address | Must be | May be |
|---------|---------|--------|
| 301 | | Star or Plus |
| 302 | Star | |
| 303 | Star | |
| 304 | | Star or Plus |
| 305 | | Star or Plus |
| 306 | | Star or Plus |
| 307 | | Star or Plus |
| 308 | Plus | |
| 309 | Plus | |
| 310 | | Plus or Triangle |
| 311 | | Star, Plus or Triangle |

If peer 130 is communicating with 302 or 303, regardless of who else it is communicating with, it can be determined that peer 130 is involved in transferring file Star. Similarly, if there is data transfer with peer 308 or 309 determines that file Plus is being transferred.

Connections with other peers (301, 304-307, 310-311) can narrow the possible files as indicated by the "May be" column.

In practice, P2P protocols seek multiple peers for transfer. It is unlikely that a collection of peers would not include unique files. In the example given, communication with peers 301-311 would indicate with certainty that Star and Plus were being transferred. File Triangle would be suspected, but not proven with this method. This is because peers 310 and 311 are involved with triangle, but transfers could be limited to Plus on 310 and Plus or Star on 311.

Such swarm participation determination thus enables, for a particular monitored peer and starting with a set of files of interest or one or more criteria for searching for such a set of files, narrowing the set of files potentially being transferred by a particular peer being monitored. With enough data, the list may often be narrowed to one file.

Cooperative Monitoring

Cooperative monitoring is a method of monitoring P2P activity, e.g., implemented by logic such as executable instructions embodied in a computer-readable storage medium that when executed carry out the method. Cooperative monitoring combines features of network monitoring and of local monitoring, and may overcome shortcoming(s) of using network monitoring alone or local monitoring alone.

Embodiments of cooperative monitoring include maintaining communication between local monitoring process, e.g., a local monitor, and network monitoring process, e.g., a network monitor (a network monitoring agent), and using the communication to allow network monitoring and local monitoring to work together, i.e., such that process can use both network monitoring and local monitoring. Maintaining communication includes, for example, maintaining network addresses of the local monitor(s) and the network monitor.

Figure 5:
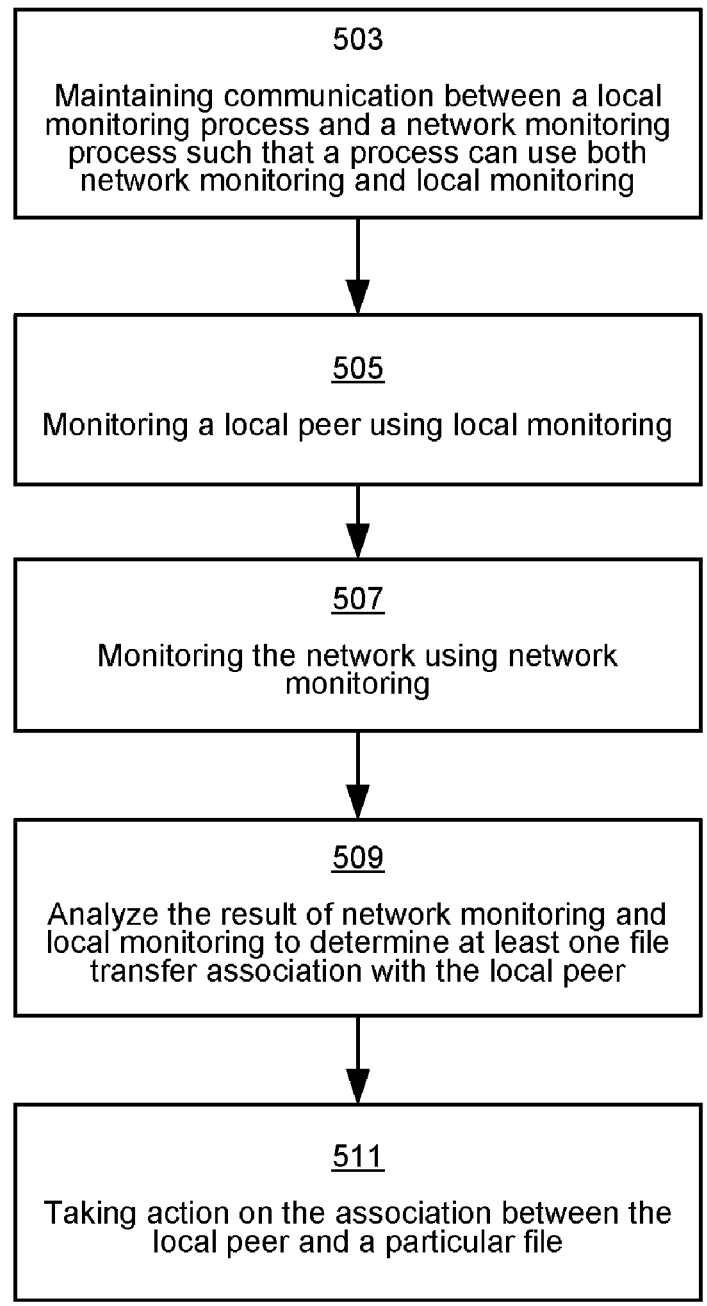
FIG. 5 shows a flowchart of a method embodiment of operating a processing system for cooperative monitoring.

FIG. 5 shows a flowchart that summarizes a method embodiment of operating a processing system for cooperative monitoring. The method includes in 503 maintaining communication between a local monitoring process and a network monitoring process such that a process can use both network monitoring and local monitoring, in 505 monitoring a local peer using local monitoring of a point in the network by monitoring packets passing through the point, in 507 monitoring the network using network monitoring by a monitoring system or agent coupled to the network, in 509 analyzing the result of network monitoring and local monitoring to determine at least one file transfer association with the local peer, e.g., association between a particular file being transferred and the local peer, and in some embodiments, in 511, taking action on the file transfer association. The analyzing may include combining the results of network monitoring with the result of local monitoring, and/or the local monitoring may use results of network monitoring, and/or the network monitoring uses the result of local monitoring.

Figure 2:
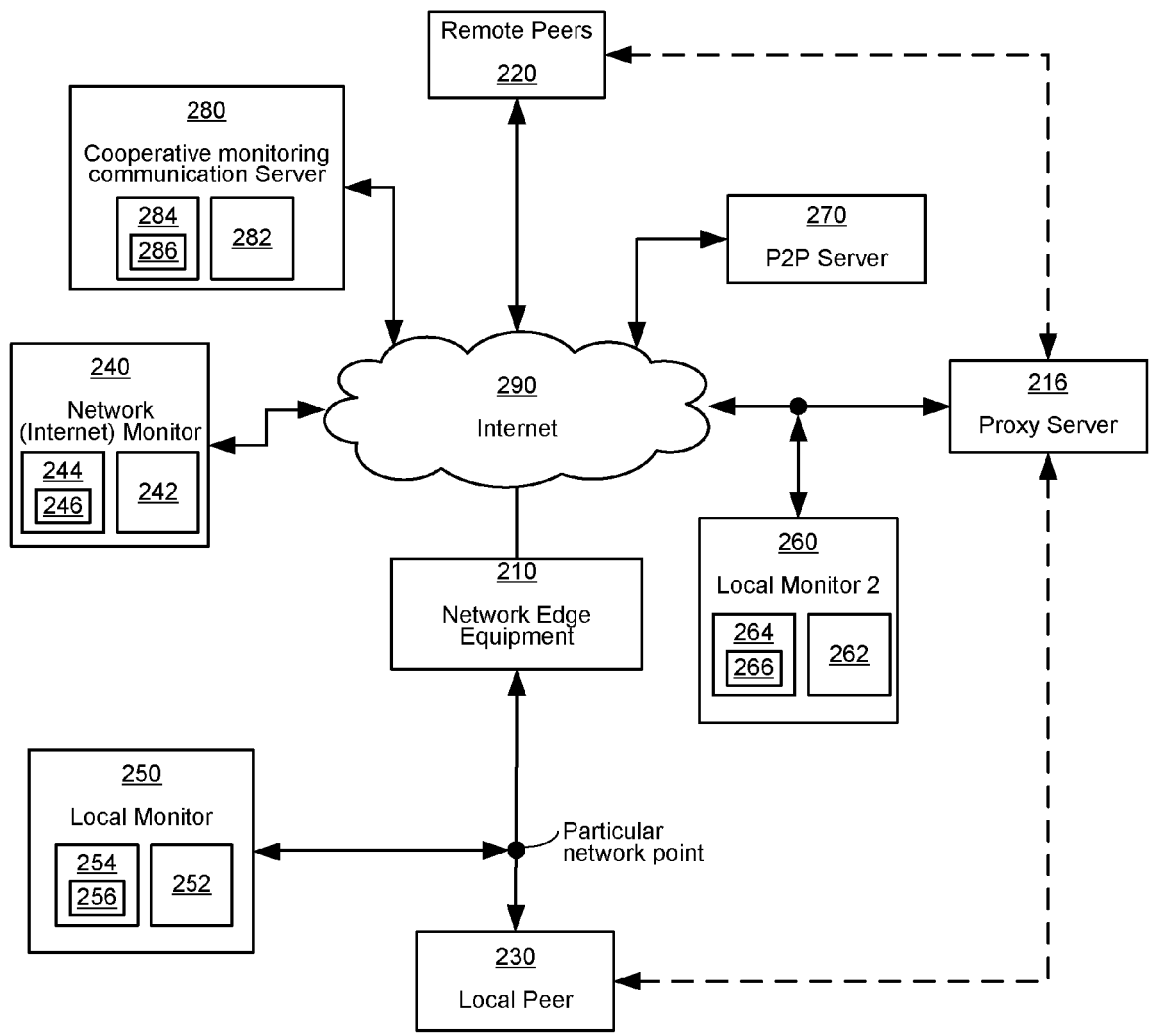
FIG. 2 shows a simplified block diagram of an example network that has a P2P server, and in which P2P activity may occur, and that includes cooperative monitoring, in which one or more embodiments of the present invention operate.

FIG. 2 shows the network 290, e.g., the Internet on which a P2P network operates. The network has coupled to it a P2P server 270, one or more peers 220 and a particular peer 230. The particular peer 230 is behind network edge equipment 210, e.g., one or more of a NET router, a firewall, and/or another edge device. A local monitor 250 that includes features of the present invention monitors packets at a particular point near the particular peer 230. In one embodiment, the local monitor 250 is included in a processing system that includes one or more processors 252 and a storage subsystem 254, and has stored therein instructions 256 (software) that when executed cause the local monitor to carry out a local monitoring process. The particular peer is called the local peer 230, also the monitored peer in this example, and the other peers are called remote peers, also other peers, and each such remote peer has the same reference numeral 220 in FIG. 2. A network monitor 240 that includes features of the present invention monitors the network 290. In one embodiment, the network monitor 240 is included in a processing system that includes one or more processors 242 and a storage subsystem 244, and has stored therein instructions 246 (software) that when executed cause the network monitor to carry out a network monitoring process. In FIG. 2, a second local monitor 260 also is included and coupled to another point in the network 290. In one embodiment, the second local monitor 260 is included in a processing system that includes one or more processors 262 and a storage subsystem 264, and has stored therein instructions 266 (software) that when executed cause the second local monitor to carry out a local monitoring process for a second particular point.

In one embodiment, a cooperative monitoring communication server 280 is coupled to the network and configured to establish communication between the network monitor 240 and any local monitors such as local monitors 250 and 260. The cooperative monitoring communication server 280 includes one or more processors 282 and a storage subsystem 284, and has stored therein the network addresses, e.g., IP addresses of the local monitors 250, 260 and the network monitor 240, and also instructions (software) that when executed cause establishing and maintaining communication between the local monitors 250, 260 and the network monitor 240. The instructions and the data structure(s) for the network addresses are shown as block 286 in FIG. 2.

In one embodiment, the cooperative monitoring communication server 280 includes domain name server (DNS) service, e.g. in the form of instructions as part of the instructions in 286 of the storage subsystem, such instructions, when executed by the one or more processors 282, providing domain name service. For example, in one embodiment, each of the network monitor 240 and the one or more local monitors 250,260 use the cooperative monitoring communication server 280 to look up each others network addresses to communicate. In one embodiment, communication between the network monitor and the local monitor(s) uses TCP/IP. As would be understood by those in the art, other protocols are known, and in alternate embodiments another such protocol is used.

Note also that while FIG. 2 shows a separate device 280 for establishing and maintaining communication, those in the art would understand that the services provided by the cooperative monitoring communication server 280 can be by software operating on any processing system coupled to the network. Thus, while in one embodiment, a cooperative monitoring communication server 280 maintains lists of network addresses of all local and network monitors, in one alternate embodiment, each local monitor and network monitor maintains lists of network addresses, e.g., IP addresses of other monitoring processing systems coupled to the network. Such lists are updated from time to time. In the interest of brevity, more details of how to achieve this are not provided herein, and how to so maintain and update network address lists would be clear to those in the art.

In the cooperative monitoring embodiments described hereinunder, a process, e.g., as a result of instructions embodied in a storage medium being executed on a separate server such as the cooperative monitoring communication server 280 coordinates the processes that are carried out in the local and network monitors of the cooperative monitoring, and for example, carries out the final analysis and any action taken as a result of the monitoring, in different alternate embodiments, the coordination function and/or the final analysis and any action function(s) are carried out by other elements, e.g., one of the local monitors, or the network monitor.

Confirmed Identity Identification with Network Monitoring for Detection and Local Monitoring for Identification One method of cooperating monitoring called "confirmed identity identification" herein includes in network monitoring 507 using network monitoring for detection of P2P activity, and in local network monitoring 509 receiving information on the detected P2P activity and using local monitoring for identification to identify computer system(s) on the network that may be involved in the detected P2P activity.

Peer to peer networks typically contain a fair amount of out-of-date ("stale") data, particularly related to peers. One method of ensuring that a peer is active is to contact the peer directly. Unfortunately, many IP addresses are unroutable on the network because of one or more factors, such as the use of firewalls and/or of NAT devices. Those in the art would of course understand that establishing the presence of a peer does not need to include connecting to the peer. For some applications, simply identifying the correct IP of the peer is sufficient.

With confirmed identity identification, a network monitor 240 is configured to detect P2P activity and determine network address information, e.g., using standard network monitoring methods. It is known that network addresses can be used to identify which portion of a network is addressed. In one embodiment, confirmed identity identification uses network address information obtained by network monitoring to determine the portion of the network where the activity was occurring. The confirmed identity identification method further includes one or more local monitoring systems covering the portion of the network so determined by the network monitoring.

As an example, suppose there is a university network with a local domain that is behind a NAT device. The university network would use at least one IP address. A network monitoring system would be able to obtain (see) the network address (and possibly port information) for the IP address. Suppose the university network includes a local monitoring system on the university side of the NAT. For example, referring to FIG. 2, suppose the university network is behind an edge device 210 that includes a NAT server. The first local monitoring system 250 is configured to monitor packets at a particular point in the university's network. Such a local monitoring system 250 would know the external IP address(es) of the university network; communication has been established between the network monitor 240 and local monitor 250.

The confirmed identity identification method includes the network monitoring system 240 detecting P2P activity, and communicating with the local monitoring system 250 to send information about the detected P2P activity, including any identifying information obtained. Such identifying information likely includes at least one IP address, and may also or instead include information about the packets involved, or about the P2P participating computer system itself.

The confirmed identity identification method includes the local monitoring system 250 identifying the computer system(s) on the network involved in the detected P2P activity. Different embodiments use one or more methods for identifying the computer system(s). Many such methods are known. One simple method includes obtaining address translation information from the NAT server in the edge device 210. The IP address and port could be directly translated using such data. Alternate computer identifying information include, but are not limited to, observing packet flow information, e.g., observing the same packets both within the local network and on the Internet, and carrying out packet inspection.

The confirmed identity identification method includes the local monitoring system 250 sending information to the cooperating monitoring process, e.g., to the network monitoring system 240 after identifying the computer system(s). In one version, the local monitoring system 250 sends IP address information from the local network. The local monitoring system 250 alternatively or in addition uses other information such as DHCP logs to map IP address to particular network devices, e.g., to computers coupled to the network, thus providing longer-term tracking information. In one embodiment, the local monitoring system 250 further looks up an AAA (authentication, authorization, and accounting) server such as a server using the RADIUS protocol, to obtain actual user information.

In one confirmed identity identification method embodiment, the taking action 511 includes the local monitoring system 250 logging data, reporting data to the cooperative networking process, e.g., the network monitoring system 240, reporting results to a local authority and/or reporting directly to the user, e.g., sending an email to the user, and/or redirecting the user's browser, and so forth. Different embodiments include different ones or combinations of one or more such action features.

Confirmed Activity Identification Including Local Monitoring Identification and Activity Detection and Network Monitoring Activity Determination One method of cooperating monitoring is called "confirmed activity identification" and includes using local monitoring for identification and activity detection, and network monitoring for activity determination. Confirmed activity identification is similar to confirmed activity identification. This mechanism is the same as confirmed identity identification, with one or more additional step(s).

As in the case of confirmed identity identification, one method embodiments of confirmed activity identification includes the network monitoring system 240 communicating information to the local monitoring system 250, and the local monitoring system 250 identifying one or more particular computer systems. After the local monitoring system 250 has identified a particular computer system, local monitoring system 250 acts as a proxy for the network monitoring system by connecting directly to the identified computer system(s). This connection is used in one embodiment to confirm P2P activity and/or to confirm an identified computer system is offering at least one file to other peers for sharing.

The local monitoring system 250 in one embodiment of confirmed activity identification also passively observes local packets and associated behavior to determine activity. In different embodiments, for example, the local monitoring system 250 carries out one or more of:

Observing packets that exhibit P2P behavior.
Inspecting packets for peer-to-peer protocols and/or content.
Extracting data to match to known titles.

The information gathered may be logged, and/or used to generate messages to the user and/or network monitor 240.

In one embodiment of confirmed activity identification, the local monitoring system 250 thus logs data, reports data to the network monitoring system 240, report results to a local authority and/or reports directly to the user, e.g., sending an email to the user, and/or redirecting the user's browser, and so forth. Different embodiments include different features or combinations of one or more such features.

Triggered Swarm Join with Local Monitoring Detection, Network Monitoring Candidate Activity Determination, Local Monitoring Connection and Local Monitoring Confirmation One method of cooperating monitoring is called "triggered swarm join" herein and includes using local monitoring for identification and activity detection, and network monitoring for activity determination. The confirmed activity identification is substantially as described in the confirmed activity identification Section above. Triggered swarm join adds one or more additional steps to the confirmed identity identification method.

In one embodiment, a local monitoring system 250 inspects packets to detect P2P protocol activity, generally through traffic flow analysis or DPI. Once activity is detected, the method includes obtaining more information on transactions of the activity.

A triggered swarm method is particularly useful for the case of a computer system involved in P2P file exchange using protocol encryption. In such a situation, a local monitor 250 might be able to detect that the computer is involved in P2P traffic, but would not directly know whether the activity is legitimate or not.

In one embodiment, once activity and a transaction thereof are detected, the triggered swarm method includes, the local monitor 250 extracting endpoint information for the transaction, in particular the IP addresses and ports of one or more other participants in the transaction.

The method includes, the local monitor 250 sending endpoint information to the network monitoring system 240.

The network monitoring system 240 monitors the transaction using one or more network monitoring steps. One embodiment includes the network monitor carrying out swarm participation determination to determine which files might be involved in the transaction.

As one example of such network monitoring, consider monitoring for the BitTorrent protocol. Recall, a peer (the local peer or another peer) can be a seed and/or a leecher. In one embodiment, the local monitoring system 250 identifies IP addresses and ports for trackers and peers—seeds and leechers—and passes this information to the network monitoring system 240. The network monitoring system 240 receives the network addresses and determines what torrents are hosted on a tracker and which peers are involved in transactions. How to so determine what torrents are hosted on a tracker and which peers are involved in transactions would be known to one of skill in the art. As an example, such torrent determining includes scraping torrent sites for content of interest. One torrent and peer determining method for example uses ScrapeTorrent (see scrapetorrent^dot^com, retrieved on Apr. 28, 2008) to determine torrent sites, contacting all trackers, retrieving peer information, and retrieving additional peers through peer exchange protocols such as distributed hash table (DHT) protocols used in BitTorrent. Once the torrent and peer information is obtained, the method includes the network monitoring system 240 examining the combinations of peers and ascertaining which torrents are being transferred.

As another example of such network monitoring, consider monitoring for the ed2k protocol, commonly known as eDonkey. DHTs are also used in an eDonkey network. Further examples that use DHTs include YaCy, and the Coral Content Distribution Network.

Once the network monitoring system 240 has interpreted the activity, one embodiment includes the network monitoring system 240 logging information. One embodiment includes the network monitoring system 240 communicating information to another network entity, e.g., the local monitoring system 250 similarly to as with confirmed identity identification and confirmed activity identification.

Multi-Point ID (Proxies)

One difficulty in monitoring P2P activity occurs as a result of peers obfuscating their identity, e.g., by using proxy servers. A proxy server, also simply called "a proxy" is a processing system coupled to a network that performs requests service on behalf of, i.e., acts as a proxy for another network-connected device. The term proxy also refers to the service operating on a proxy server. When a local peer 130 uses a proxy in a P2P network, requests from the local peer 130 appear to other computer systems on the network to be from the proxy rather than from the local peer. FIG. 2 shows a proxy server 216 coupled to the network. A particular local peer 230 contacts the proxy server 216 through the network, e.g., the Internet 290. Proxy server 216 forwards requests and implicitly hides IP address and port information. Access from the local peer 230 to remote peers 220 occurs through virtual paths via the proxy server 216.

While proxy servers provide one mechanism, those in the art also would be familiar with methods analogous to use of proxy servers that have the same effect of obfuscating originating source. One such alternate to using a proxy is commonly known as onion routing. There is a project called The Onion Router (TOR). See, for example, www^dot^torproject-^dot^org (retrieved 24 Apr. 2008), www^dot^onion-router^do-t^net, and en^dot^wikipedia^dot^org/wiki/Tor (anonymity network) (retrieved 24 Apr. 2008), where ^dot^ represents a period in these URLs. Onion routing provides low-latency Internet-based connections that resist traffic analysis, eavesdropping, and other attacks both by outsiders (e.g. Internet routers) and insiders (Onion Routing servers themselves). Onion routing prevents the transport medium from knowing who is communicating with whom—the network knows only that communication is taking place. In addition, the content of the communication is hidden from eavesdroppers up to the point where the traffic leaves the onion routing network. While the description herein is in terms of a proxy server, the embodiments described herein also apply to using these alternative mechanisms of obfuscating network location, such as onion routing.

One embodiment of the invention as shown in FIG. 2 includes using a second local monitor 260 that inspects traffic in the same address space as a proxy router.

In another example embodiment, there is no second local monitor for traffic from proxy server 216 to the Internet 290. Even in such a second embodiment, it is still possible in many cases to determine P2P activity. To do so, sufficient information needs to be collected about the local peer 230 activity, remote peer 220 activity and P2P server 270 activity.

Figure 6:
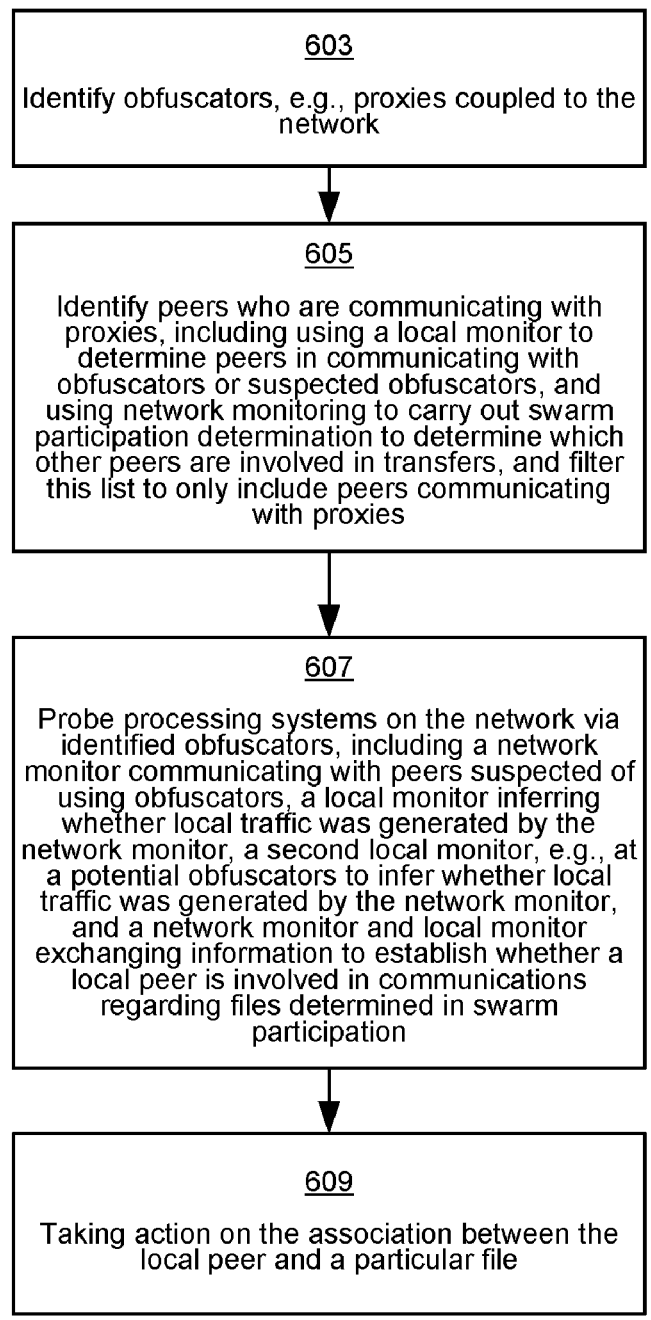
FIG. 6 shows a flowchart of one embodiment of a method of determining P2P activity for a local peer 230 in the presence of obfuscators

FIG. 6 shows a flowchart of one embodiment of a method of determining P2P activity for a local peer 230 in the presence of obfuscators, and includes the following steps:

In 603, identifying obfuscators, e.g., proxies coupled to the network. Different embodiments of identifying obfuscators using one or more different obfuscator identifying methods. Such methods include, for the case of proxies:

Use a pre-determined or determined list of proxies, e.g., gathered ahead of time, and in another version generated by observing traffic patterns.

Identify proxies by evaluating their behavior, either by communicating with and/or through them or by monitoring traffic.

Identify proxies by probing or monitoring starting with a list of peers. For example, one can use the list of peers as a list of potential (suspected) proxies, and carry out probing and/or monitoring of only such systems. See "Identifying peers" below for determining the peer list.

In 605, identifying peers who are communicating with proxies, e.g., by collecting or determining lists of peers. This includes:

Using a local monitor 250, identify local peers and collect lists of local peers, such as local peer 230 that are communicating with obfuscators, or if obfuscators are not yet identified, that are communicating with potential (suspected) obfuscators.

Using a network monitor 240, carry out swarm participation determination to determine which other peers are involved in transfers, and filter this list to only include peers communicating with proxies.

In 607, probing local processing systems through obfuscators. This includes one or more of the following:

Network monitor 240 connecting or otherwise communicate with peers suspected of using obfuscators. This would generate traffic at the local peer 230 side of the connection.

Local first monitor 250 observing traffic and inferring whether traffic at local peer 230 was generated by network monitor 240. Note that multiple local monitors may be used to observe multiple local peers, such as local peer 230. Furthermore, some other local monitors, e.g., monitor 260 can be used to observe traffic at a proxy or potential proxy server 216.

Use a second local monitor 260 to infer whether the traffic generated by network monitor 240 is being received by the local peer. There are a variety of ways this can be done, and these can be used alone or in combination. Some examples include:

Observing the timing of packets sent and received.
Observing packet times.
Observing packet types.
Examining packet content.

Note that not all of these may be possible in all situations. For example, examining packet content would not be possible on an encrypted channel.

Detect one or more characteristics, such as unusual packet sizes, distinguishing timing and specific types or content that is generated by the network monitor.

Establishing whether the local peer is involved in communications regarding files determined in swarm participation determination by network monitor 240 and local monitor 250 exchanging information.

In 609, taking action on the association between local peer 230 and a file.

The above described method can work with one or more proxies. A plurality of proxies can be used in series, parallel or in a combination of series and parallel connections. That is, the above described method would work if proxy server 216 is a single proxy server, if proxy 216 represents multiple proxy servers with traffic divided between them, if proxy 216 represents multiple proxy servers through which traffic is routed, or if proxy 216 represents any combination of these.

To network monitor 240, a proxy looks similar to a NAT server translating addresses. If the second local monitor 260 is able to monitor the proxy server 216's traffic to and from Internet 290, the case of using a proxy reverts to the other cases where a local monitor resides on the network; that is those where proxy server 216 is not involved in communications. Similarly, if instances of second local monitor 260 is monitoring all intermediate proxies, it can step-by-step determine routing to local peer 230 and reduce the multi-point ID case to those without proxy server 216.

Taking Action: Cooperative Response Based on Cooperative Monitoring

Once an identification has been made, some embodiments of the present invention include taking actions as they would for network monitoring or local monitoring. There are many such actions possible and desirable, including, but not limited to:

Informing the P2P participant, informing their network service provider (ISP, university network, etc.).

Taking direct action on their network activity, e.g., disrupting the transfer, suspending service, terminating service, and/or redirecting a port (e.g., port 80) to force a browser-based "teachable moment". A "teachable moment" is an opportunity to teach about such subjects as the damage done by file sharing, so as to promote a mindset of not carrying out illegal file sharing. A teachable moment includes taking a claim of infringement and turning it into an opportunity for affecting behavior.

Cooperative monitoring as described herein has the benefit of allowing responses that can be performed as a result of local monitoring, the result of network monitoring or both local and network monitoring. For example, a network monitoring, e.g., an Internet monitoring system 240 cannot generally take an action on the network. With cooperative monitoring, action can be taken regardless of where the activity or activities is/are detected. To carry such action out as a result of network monitoring, the network monitor 240 communicates with a local monitor.

Note that the responses described herein are generally combined approaches. However, the invention is not limited to taking such a combined approach to responding or to taking action. A monitoring system or device may respond as it would without the cooperative aspect. For example, a network monitoring system 240 may respond with an email notification, e.g., a Digital Millennium Copyright Act (DMCA) notice. A local monitoring system may respond with redirecting port 80 to a closed set or exclusive set of information services provided for users, known as a "walled garden," for further disposition.

Thus has been described a method for cooperative monitoring of P2P activity.

While the embodiments described above were described in terms of methods, other embodiments of the invention are in the form a computer-readable medium that is encoded with computer-executable instructions that when executed by one or more processors of a processing system, e.g., in an encoding system or sub-system cause any of the methods described herein to be carried out.

One embodiment is in the form of logic encoded in one or more tangible media for execution and when executed operable to carry out any of the methods describe herein. One embodiment is in the form of software encoded in one or more computer-readable media and when executed operable to carry out any of the methods described herein.

It should be appreciated that although embodiments of the invention have been described in the context one or another peer to peer network, e.g., BitTorrent, alternative embodiments of the present invention are not limited to such contexts and may be used in various other applications and systems. Furthermore, embodiments are not limited to any one type of architecture or protocol, and thus, may be used in conjunction with one or a combination of other architectures/protocols.

Unless specifically stated otherwise, as apparent from the following discussions, it is appreciated that throughout the specification discussions using terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" or system or computer may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Note that when a method is described that includes several elements, e.g., several steps, no ordering of such elements, e.g., of such steps is implied, unless specifically stated.

The methodologies described herein are, in one embodiment, performable by one or more processors that accept computer-executable logic, e.g. instructions encoded on one or more computer-readable tangible storage media in which are encoded a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable medium that is configured with logic (e.g., software) including a set of instructions to cause performing, when executed by one or more processors, one of more of the methods described herein. The software may reside in the hard disk, or may also reside, completely or at least partially, within the RAM and/or within the processor during execution thereof by the computer system. Thus, the memory and the processor also constitute computer-readable storage medium on which is encoded logic, e.g., in the form of instructions.

Furthermore, a computer-readable storage medium may form, or be included in a computer program product.

Note also that while one embodiment is for monitoring of the Internet, the invention is usable in any network environment, and is not limited to the Internet. Therefore, as used herein, the term Internet monitoring is not limited to monitoring the Internet, but rather is applicable to whatever network is being monitored.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the logic including instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable medium in which are encoded a set of instructions, e.g., a computer program that are for execution on one or more processors, e.g., one or more processors that are part of an encoding system. Thus, as will be appreciated by those skilled in the art, embodiments of the present invention may be embodied as a method, an apparatus such as a special purpose apparatus, an apparatus such as a data processing system, or a medium, e.g., a computer program product. The computer-readable medium carries logic including a set of instructions that when executed on one or more processors cause the apparatus that includes the processor or processors to implement a method. Accordingly, aspects of the present invention may take the form of a method, an entirely hardware embodiment, an entirely software embodiment or an embodiment combining software and hardware aspects. Furthermore, the present invention may take the form of medium (e.g., a computer program product on a computer-readable storage medium) carrying computer-readable program code embodied in the medium.

While a medium is shown in an example embodiment to be a single medium, the term "medium" should be taken to include a single medium or multiple media (e.g., a centralized or distributed database, and/or associated caches and servers) that store the one or more sets of instructions. The term "medium" shall also be taken to include any medium that is capable of storing, encoding a set of instructions for execution by one or more of the processors and that cause the one or more processors to perform any one or more of the methodologies of the present invention. A medium may take many forms, including tangible storage media. Non-volatile media includes, for example, optical, magnetic disks, and magneto-optical disks. Volatile media includes dynamic memory, such as main memory. For example, the term "medium" shall accordingly be taken to included, but not be limited to, solid-state memories, a computer product embodied in optical and magnetic media.

It will be understood that the steps of methods discussed are performed in one embodiment by an appropriate processor (or processors) of a processing (i.e., computer) system executing instructions stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Any U.S. patent publications, U.S. patents, and U.S. patent applications cited herein are hereby incorporated by reference, except for any material incorporated by reference in such patent publications, patents, and patent applications and not explicitly incorporated by reference in the present disclosure.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

I claim:

1. A method of operating a processing system for cooperative monitoring of peer-to-peer activity on a network, the method comprising:
   maintaining communication between a local monitoring process and a network monitoring process such that a process can use both network monitoring and local monitoring;
   monitoring a local peer using local monitoring of a point in the network by monitoring packets passing through the point;
   monitoring the network using network monitoring by a monitoring system or agent coupled to the network, wherein network monitoring includes the monitoring system or agent using one or more peer-to-peer protocols to collect information on peer-to-peer activity;
   analyzing the result of network monitoring and local monitoring to determine at least one file transfer association with the local peer,
   wherein the maintaining communication between a local monitoring process and a network monitoring process includes at least one of step A, step B, and step C,
   Step A being that the analyzing includes combining a result of network monitoring with a result of local monitoring,
   Step B being that the local monitoring uses a result of network monitoring, and
   Step C being that the network monitoring uses a result of local monitoring.

2. A method as recited in claim 1, further comprising:
   taking action on the file transfer association with the local peer.

3. A method as recited in claim 1, wherein the network monitoring is configured to detect peer-to-peer activity, and the local network monitoring includes receiving information from the network monitoring process on the detected peer-to-peer activity and using local monitoring to identify computer system(s) on the network that may be involved in the detected peer-to-peer activity.

4. A method as recited in claim 1,
   wherein the network monitoring is configured to detect peer-to-peer activity, and
   wherein the local network monitoring includes:
      receiving information from the network monitoring process on the detected peer-to-peer activity;
      using local monitoring to identify computer system(s) on the network that may be involved in the detected peer-to-peer activity;

connecting directly to one or more of the identified computer systems to confirm peer-to-peer activity and/or to confirm that an identified computer system is offering at least one file to other peers for sharing.

5. A method as recited in claim 4, wherein the local network monitoring further includes for the local peer one or more of observing packets that exhibit P2P behavior, inspecting packets for peer-to-peer protocols and/or content, and/or extracting data to match to known titles.

6. A method as recited in claim 1,
wherein the local network monitoring includes:
analyzing the packets at the point in the network to detect peer-to-peer activity, and at least one transaction of the activity;
extracting endpoint information on the transaction;
sending endpoint information to the network monitoring process, and
wherein the network monitoring includes:
receiving the endpoint information from the local monitoring process; and
monitoring the transaction.

7. A method as recited in claim 6, wherein the monitoring the transaction by the network monitoring includes swarm participation determination to determine which file or files might be involved in the transaction.

8. A method as recited in claim 1, wherein the network includes one or more obfuscators, the method further including:
identifying obfuscators coupled to the network; and
probing processing systems on the network via identified obfuscators.

9. A method as recited in claim 8,
wherein for the identifying obfuscators coupled to the network,
one or more of the local monitoring process and any other local monitoring processes for other points on the network are used to identify peers that are communicating with any identified obfuscators, and
network monitoring is used to carry out swarm participation determination to determine which peers are involved in transfers, further filtering the determined peers to include only peers communicating with any identified obfuscators,
wherein for the probing processing systems on the network,
the network monitoring process communicates with peers suspected of using obfuscators,
the local monitoring process and optionally one or more other local monitoring process inferring whether respective local traffic was generated by the network monitoring process's communicating;
the network monitoring process and the local monitoring process exchanging information to establish whether a local peer is involved in communications regarding files determined in the swarm participation determination.

10. A method as recited in claim 1, wherein the network monitoring process is configured to carry out swarm participation determination.

11. A method as recited in claim 10, wherein the swarm participation determination includes:
for a set of files of interest,
collecting network addresses involved in a peer file exchange;
for a particular peer being monitored by the local monitoring process, determining the network addresses of other peers with which the monitored peer is transferring data; and
analyzing the set of files of interest, collected network addresses of peers involved in a peer file exchange, and determined network addresses with which one or more monitored peers is transferring data to determine one or more candidate files as files being exchanged.

12. A method as recited in claim 11, wherein the set of files of interest is determined by searching according to a set of one or more criteria.

13. One or more computer-readable and non-transitory storage media configured with instructions that when executed by one or more processors of at least one processing system coupled to a network cause cooperative monitoring of peer-to-peer activity on the network, the cooperative monitoring including:
maintaining communication between a local monitoring process and a network monitoring process such that a process can use both network monitoring and local monitoring,
monitoring a local peer using local monitoring of a point in the network by monitoring packets passing through the point;
monitoring the network using network monitoring by a monitoring system or agent coupled to the network, wherein network monitoring includes the monitoring system or agent using one or more peer-to-peer protocols to collect information on peer-to-peer activity;
analyzing the result of network monitoring and local monitoring to determine at least one file transfer association with the local peer,
wherein the maintaining communication between a local monitoring process and a network monitoring process includes at least one of step A, step B, and step C,
Step A being that the analyzing includes combining a result of network monitoring with a result of local monitoring,
Step B being that the local monitoring uses a result of network monitoring, and
Step C being that the network monitoring uses a result of local monitoring.

14. One or more computer-readable and non-transitory storage media as recited in claim 13, wherein the cooperative monitoring further comprises:
taking action on the file transfer association with the local peer.

15. One or more computer-readable and non-transitory storage media as recited in claim 13, wherein the network monitoring is configured to detect peer-to-peer activity, and the local network monitoring includes receiving information from the network monitoring process on the detected peer-to-peer activity and using local monitoring to identify computer system(s) on the network that may be involved in the detected peer-to-peer activity.

16. One or more computer-readable and non-transitory storage media as recited in claim 13,
wherein the network monitoring is configured to detect peer-to-peer activity, and
wherein the local network monitoring includes:
receiving information from the network monitoring process on the detected peer-to-peer activity;
using local monitoring to identify computer system(s) on the network that may be involved in the detected peer-to-peer activity;

connecting directly to one or more of the identified computer systems to confirm peer-to-peer activity and/or to confirm that an identified computer system is offering at least one file to other peers for sharing.

17. One or more computer-readable and non-transitory storage media as recited in claim 16, wherein the local network monitoring further includes for the local peer one or more of observing packets that exhibit P2P behavior, inspecting packets for peer-to-peer protocols and/or content, and/or extracting data to match to known titles.

18. One or more computer-readable and non-transitory storage media as recited in claim 13,
wherein the local network monitoring includes:
analyzing the packets at the point in the network to detect peer-to-peer activity, and at least one transaction of the activity;
extracting endpoint information on the transaction;
sending endpoint information to the network monitoring process,
wherein the network monitoring includes:
receiving the endpoint information from the local monitoring process; and
monitoring the transaction.

19. One or more computer-readable and non-transitory storage media as recited in claim 18, wherein the monitoring the transaction by the network monitoring includes swarm participation determination to determine which file or files might be involved in the transaction.

20. One or more computer-readable and non-transitory storage media as recited in claim 13, wherein the network includes one or more obfuscators, and wherein the cooperative monitoring further includes:
identifying obfuscators coupled to the network; and
probing processing systems on the network via identified obfuscators.

21. One or more computer-readable and non-transitory storage media as recited in claim 20,
wherein for the identifying obfuscators coupled to the network,
one or more of the local monitoring process and any other local monitoring processes for other points on the network are used to identify peers that are communicating with any identified obfuscators, and
network monitoring is used to carry out swarm participation determination to determine which peers are involved in transfers, further filtering the determined peers to include only peers communicating with any identified obfuscators,
wherein for the probing processing systems on the network,
the network monitoring process communicates with peers suspected of using obfuscators,
the local monitoring process and optionally one or more other local monitoring process inferring whether respective local traffic was generated by the network monitoring process's communicating;
the network monitoring process and the local monitoring process exchanging information to establish whether a local peer is involved in communications regarding files determined in the swarm participation determination.

22. Apparatus comprising one or more processing systems that each include at least one processor and a storage subsystem, the one or more processing systems coupled to a network, and configured to carry out cooperative monitoring of peer-to-peer activity on the network by being configured to:
maintain communication between a local monitoring process operating on one of the processing systems that is coupled to a point of the network and a network monitoring process operating on one of the processing systems such that cooperative monitoring can use both network monitoring and local monitoring,
monitor a local peer using local monitoring of the point in the network by monitoring packets passing through the point on the processing systems coupled to the point of the network;
monitor the network using network monitoring, wherein network monitoring includes the network monitoring process using one or more peer-to-peer protocols to collect information on peer-to-peer activity;
analyze the result of network monitoring and local monitoring to determine at least one file transfer association with the local peer,
wherein the maintaining communication between the local monitoring process and the network monitoring process includes at least one of step A, step B, and step C,
Step A being that the analyzing includes combining a result of network monitoring with a result of local monitoring,
Step B being that the local monitoring uses a result of network monitoring, and
Step C being that the network monitoring uses a result of local monitoring.

23. Apparatus as recited in claim 22, wherein the one or more processing systems are further configured to take action on the file transfer association with the local peer.

24. Apparatus as recited in claim 22, wherein the analyzing includes combining a result of network monitoring with a result of local monitoring, and/or wherein the local monitoring may use a result of network monitoring, and/or wherein the network monitoring uses a result of local monitoring.

25. Apparatus as recited in claim 22,
wherein the network monitoring is configured to detect peer-to-peer activity, and
wherein the local network monitoring includes:
receiving information from the network monitoring process on the detected peer-to-peer activity;
using local monitoring to identify computer system(s) on the network that may be involved in the detected peer-to-peer activity;
connecting directly to one or more of the identified computer systems to confirm peer-to-peer activity and/or to confirm that an identified computer system is offering at least one file to other peers for sharing.

26. Apparatus as recited in claim 25, wherein the local network monitoring further includes for the local peer one or more of observing packets that exhibit P2P behavior, inspecting packets for peer-to-peer protocols and/or content, and/or extracting data to match to known titles.

27. Apparatus as recited in claim 22,
wherein the local network monitoring includes:
analyzing the packets at the point in the network to detect peer-to-peer activity, and at least one transaction of the activity;
extracting endpoint information on the transaction;
sending endpoint information to the network monitoring process, and
wherein the network monitoring includes:
receiving the endpoint information from the local monitoring process; and
monitoring the transaction.

28. Apparatus as recited in claim 27, wherein the monitoring the transaction by the network monitoring includes swarm participation determination to determine which file or files might be involved in the transaction.

29. Apparatus as recited in claim 22, wherein the network includes one or more obfuscators, and wherein the one or more processing systems are further configured to:
   identify obfuscators coupled to the network; and
   probe processing systems on the network via identified obfuscators.

30. Apparatus as recited in claim 29,
   wherein for the identifying obfuscators coupled to the network,
      one or more of the local monitoring process and any other local monitoring processes for other points on the network are used to identify peers that are communicating with any identified obfuscators, and
      network monitoring is used to carry out swarm participation determination to determine which peers are involved in transfers, further filtering the determined peers to include only peers communicating with any identified obfuscators,
   wherein for the probing processing systems on the network,
      the network monitoring process communicates with peers suspected of using obfuscators,
      the local monitoring process and optionally one or more other local monitoring process inferring whether respective local traffic was generated by the network monitoring process's communicating;
      the network monitoring process and the local monitoring process exchanging information to establish whether a local peer is involved in communications regarding files determined in the swarm participation determination.

* * * * *

UNITED STATES PATENT AND TRADEMARK OFFICE
CERTIFICATE OF CORRECTION

| | | |
|---|---|---|
| PATENT NO. | : 8,015,283 B2 | Page 1 of 1 |
| APPLICATION NO. | : 12/432562 | |
| DATED | : September 6, 2011 | |
| INVENTOR(S) | : Seidel | |

It is certified that error appears in the above-identified patent and that said Letters Patent is hereby corrected as shown below:

In Column 4, lines 37–38, after "typically also the", kindly replace "TCP/IDP" with --TCP/UDP--.

In Column 23, line 19, after "process", kindly insert --and--.

Signed and Sealed this
Eighteenth Day of October, 2011

David J. Kappos
*Director of the United States Patent and Trademark Office*